(12) United States Patent
Davis

(10) Patent No.: US 11,721,977 B2
(45) Date of Patent: *Aug. 8, 2023

(54) AUTOMATIC DISCOVERY OF ELECTRICAL SUPPLY NETWORK TOPOLOGY AND PHASE

(71) Applicant: Landis+Gyr Innovations, Inc., Alpharetta, GA (US)

(72) Inventor: Ian Jackson Davis, Peakhurst Heights (AU)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,496

(22) Filed: Jan. 19, 2022

(65) Prior Publication Data

US 2022/0149623 A1    May 12, 2022

Related U.S. Application Data

(63) Continuation of application No. 16/800,315, filed on Feb. 25, 2020, now Pat. No. 11,245,260.

(51) Int. Cl.
*H02J 3/12* (2006.01)
*H02J 13/00* (2006.01)
*G05B 13/02* (2006.01)

(52) U.S. Cl.
CPC ............ *H02J 3/12* (2013.01); *G05B 13/0265* (2013.01); *H02J 13/00002* (2020.01)

(58) Field of Classification Search
CPC .. H02J 3/12; H02J 13/00002; H02J 13/00016; H02J 13/00022; G05B 13/0265; G01D 2204/40; G01D 4/004

See application file for complete search history.

(56) References Cited

U.S. PATENT DOCUMENTS 6,615,147 B1   9/2003  Jonker et al.
6,816,360 B2  11/2004  Brooksby et al.
(Continued)

FOREIGN PATENT DOCUMENTS

WO   2018027180   2/2018
WO   2018072030   4/2018
(Continued)

OTHER PUBLICATIONS

"IEEE Xplore Search Results", Mar. 24, 2021, 1 page.
(Continued)

*Primary Examiner* — Ziaul Karim
(74) *Attorney, Agent, or Firm* — Kilpatrick Townsend & Stockton LLP

(57) ABSTRACT

A system for discovering the topology and phase of an electrical power distribution system is provided. For example, a group of meters connected to an electrical power distribution system can process sensor data obtained at the meters and generate descriptors based on the processed data and transmit the descriptors to a headend system. The headend system can, after receiving the descriptors from the various meters in the system, group these meters to generate a grouping by applying clustering algorithms to the descriptors of these meters. The headend system can further compare the current grouping with past groupings to determine a confidence level of the current grouping and assign a segment identifier or a phase identifier or both to one or more of the meters based on the confidence level.

14 Claims, 8 Drawing Sheets

(56) References Cited

U.S. PATENT DOCUMENTS

| | | | |
|---|---|---|---|
| 7,135,850 B2 | 11/2006 | Ramirez | |
| 7,469,190 B2 | 12/2008 | Bickel | |
| 7,693,670 B2 | 4/2010 | Durling et al. | |
| 7,990,806 B2 | 8/2011 | Chen | |
| 8,004,933 B2 | 8/2011 | Iseli | |
| 8,121,741 B2 * | 2/2012 | Taft | G01D 4/004 700/286 |
| 8,223,466 B2 | 7/2012 | Roscoe | |
| 8,322,215 B2 | 12/2012 | Lakich et al. | |
| 8,326,554 B2 | 12/2012 | Caird | |
| 8,635,036 B2 | 1/2014 | Pamulaparthy et al. | |
| 8,754,634 B2 | 6/2014 | Chamarti et al. | |
| 8,830,083 B2 | 9/2014 | LaFrance et al. | |
| 8,854,217 B2 | 10/2014 | Brown et al. | |
| 8,947,246 B2 | 2/2015 | Aiken | |
| 8,978,443 B2 | 3/2015 | Ramirez | |
| 8,996,144 B2 | 3/2015 | LaFrance et al. | |
| 9,164,135 B2 | 10/2015 | Cs et al. | |
| 9,304,014 B2 | 4/2016 | Komati et al. | |
| 9,341,686 B2 | 5/2016 | Deak et al. | |
| 9,476,740 B2 | 10/2016 | Zigovszki et al. | |
| 9,557,392 B2 | 1/2017 | Schuhl et al. | |
| 9,568,522 B2 | 2/2017 | Aiello et al. | |
| 9,602,895 B2 | 3/2017 | Bowling et al. | |
| 9,658,081 B2 * | 5/2017 | Vaswani | G01D 4/004 |
| 9,671,254 B2 | 6/2017 | Zigovszki et al. | |
| 9,706,499 B2 | 7/2017 | Pike et al. | |
| 9,887,051 B2 | 2/2018 | LaFrance et al. | |
| 9,891,088 B2 | 2/2018 | Zigovszki et al. | |
| 10,240,961 B2 | 3/2019 | Cheng et al. | |
| 10,254,315 B2 | 4/2019 | Higashi et al. | |
| 10,295,578 B2 | 5/2019 | Higashi et al. | |
| 10,908,198 B2 | 2/2021 | Kuloor et al. | |
| 11,183,878 B2 | 11/2021 | Kuloor et al. | |
| 2011/0311051 A1 * | 12/2011 | Resch | G06F 16/13 380/47 |
| 2012/0182157 A1 | 7/2012 | Carr | |
| 2013/0217332 A1 * | 8/2013 | Altman | G06Q 20/3224 455/3.01 |
| 2014/0005853 A1 | 1/2014 | Chen et al. | |
| 2015/0052088 A1 | 2/2015 | Arya et al. | |
| 2015/0241482 A1 | 8/2015 | Sonderegger | |
| 2015/0271557 A1 * | 9/2015 | Tabe | H04N 21/6131 725/62 |
| 2016/0276831 A1 * | 9/2016 | Karlak | G06Q 50/06 |
| 2016/0352103 A1 * | 12/2016 | Aiello | G01R 29/18 |
| 2017/0060161 A1 | 3/2017 | Tyler et al. | |
| 2017/0243138 A1 * | 8/2017 | Dzierwa | G06N 20/00 |
| 2017/0374573 A1 | 12/2017 | Kleinbeck et al. | |
| 2018/0073910 A1 | 3/2018 | Deak et al. | |
| 2018/0106640 A1 | 4/2018 | Padrones et al. | |
| 2019/0041436 A1 * | 2/2019 | Kuloor | G01R 22/063 |
| 2019/0041439 A1 | 2/2019 | Brown | |
| 2019/0041445 A1 | 2/2019 | Kuloor et al. | |
| 2019/0094329 A1 | 3/2019 | Minich | |
| 2019/0101411 A1 | 4/2019 | Davis et al. | |
| 2019/0129368 A1 | 5/2019 | Iacovella et al. | |
| 2019/0219618 A1 | 7/2019 | Davis et al. | |
| 2019/0383864 A1 | 12/2019 | Joshi et al. | |
| 2021/0288520 A1 | 9/2021 | Cardozo et al. | |

FOREIGN PATENT DOCUMENTS

| | | |
|---|---|---|
| WO | 2018083902 | 5/2018 |
| WO | 2019026791 | 2/2019 |

OTHER PUBLICATIONS

"Live Line Phase Identification—Phase ID 6000", Power Systems Integrity Inc., Accessed from Internet on Feb. 25, 2020, 2 pages.

*U.S. Appl. No. 16/155,713, Non-Final Office Action dated Mar. 18, 2020, 9 pages.

*U.S. Appl. No. 16/155,713, Notice of Allowance dated Jul. 21, 2020, 8 pages.

*U.S. Appl. No. 16/155,713, Notice of Allowance dated Oct. 13, 2020, 8 pages.

U.S. Appl. No. 16/057,178, Final Office Action dated Oct. 29, 2020, 17 pages.

U.S. Appl. No. 16/057,178, Non-Final Office Action dated Jul. 13, 2020, 13 pages.

U.S. Appl. No. 16/057,178, Notice of Allowance dated Jul. 23, 2021, 7 pages.

U.S. Appl. No. 16/057,178, Notice of Allowance dated Apr. 8, 2021, 9 pages.

U.S. Appl. No. 16/800,315, Corrected Notice of Allowability dated Oct. 19, 2021, 4 pages.

U.S. Appl. No. 16/800,315, Notice of Allowance dated Oct. 1, 2021, 12 pages.

Arya et al., "Phase Identification in Smart Grids", IEEE International Conference on Smart Grid Communications (SmartGridComm), Brussels, 2011, pp. 25-30.

Byun et al., "Cable and Phase Identification Based on Power Line Communication", International Journal of Control and Automation, vol. 8, No. 9, 2015, pp. 63-74.

Luan et al., "Smart Meter Data Analytics for Distribution Network Connectivity Verification", Institute of Electrical and Electronics Engineers Transactions on Smart Grid, vol. 6, No. 4, Jul. 2015, pp. 1964-1971.

International Patent Application No. PCT/US2021/018980, International Search Report and Written Opinion dated Jun. 11, 2021, 14 pages.

International Patent Application No. PCT/US2021/019993, International Search Report and Written Opinion dated Jun. 17, 2021, 14 pages.

Short, "Advanced Metering for Phase Identification, Transformer Identification, and Secondary Modeling", IEEE Transactions on Smart Grid, vol. 4, No. 2, Jun. 2013, pp. 651-658.

* cited by examiner

AUTOMATIC DISCOVERY OF ELECTRICAL SUPPLY NETWORK TOPOLOGY AND PHASE

RELATED APPLICATIONS

This application is a continuation of U.S. patent application Ser. No. 16/800,315, titled "Automatic Discovery of Electrical Supply Network Topology and Phase" and filed on Feb. 25, 2020 (Allowed), which is incorporated herein in its entirety.

TECHNICAL FIELD

This disclosure generally relates to electrical supply networks, and more particularly relates to the discovery of the topology and phase information of the electrical supply networks.

BACKGROUND

Utility companies typically manually track the locations of electric meters installed in the field as well as the connectivity of the electric meters to distribution transformers. For large utility companies, the number of electric meters can be upwards of a few million with distribution transformers being close to one million, rendering this manual process time consuming and error-prone. Also, the phase information is not recorded due to technical complexity, labor, time constraints, cost, equipment availability, and so on. In addition, the actual phase designation of the electric meters and associated upstream assets may change from time to time due to work performed by line crews on the system assets. Similar problems may also exist in 3-phase distribution transformers with multiple electric meters connected to them. The phases of individual electric meters are typically not recorded but need to be determined for purposes of managing loading on a power grid.

SUMMARY

Aspects and examples are disclosed for apparatuses and processes for discovering or identifying topological and phase information of assets in an electrical power distribution system. For instance, a method for discovering a topological location and phase for one or more utility devices in a resource distribution system includes receiving, by a headend system, descriptors from a plurality of utility devices connected to the electrical power distribution system. The descriptors are generated at the respective utility devices by processing sensor data obtained at the respective utility devices. The method further includes responsive to determining that at least a threshold number of descriptors for a regular mode have been received, grouping, by the headend system, the plurality of utility devices to generate a current grouping by applying clustering algorithms to the descriptors of the plurality of utility devices; comparing, by the headend system, the current grouping with past groupings to determine a confidence level of the grouping; determining, by the headend system, whether the confidence level exceeds a threshold confidence value; and in response to determining that the confidence level exceeds the threshold confidence value, assigning, by the headend system, at least one of a segment identifier or a phase identifier to one or more of the plurality of utility devices.

In another example, a method performed by a utility device to generate descriptors for discovering a topology and phase of an electrical power distribution system includes processing sensor data obtained by the utility device to generate processed data and determining whether the utility device operates in a fast mode or in a regular mode. The utility device generates descriptors at a higher rate when operating in the fast mode than when operating in the regular mode. The method further includes, in response to determining that the utility device operates in the fast mode, generating fast descriptors based on the processed data; and responsive to determining that at least a first threshold number of fast descriptors have been generated, transmitting the fast descriptors to a headend system communicatively connected to the utility device. The method also includes, in response to determining that the utility device operates in the regular mode, generating regular descriptors based on the processed data; and responsive to determining that at least a second threshold number of regular descriptors have been generated, transmitting the regular descriptors to the headend system, wherein the second threshold number is higher than the first threshold number, and wherein the fast descriptors and the regular descriptors are different.

In an additional example, a system includes a plurality of utility devices and a headend system. The plurality of utility devices are connected to an electrical power distribution system and communicatively connected to the headend system. Each utility device of the plurality of utility devices is configured for processing sensor data obtained at the utility device to generate processed data and generating and transmitting fast descriptors or regular descriptors based on the processed data. The headend system is configured for receiving the fast descriptors or the regular descriptors from the plurality of utility devices, determining whether the plurality of utility devices operate in a fast mode or a regular mode. In the fast mode, a segment identifier or a phase identifier is assigned to a utility device among the plurality of utility devices in a shorter time period than the regular mode. The headend system is further configured for, responsive to determining that the plurality of utility devices operate in the regular mode, grouping the plurality of utility devices to generate a current grouping by applying clustering algorithms to the regular descriptors of the plurality of utility devices, comparing the current grouping with past groupings to determine a confidence level of the current grouping, and assigning at least one of a segment identifier or a phase identifier to one or more of the plurality of utility devices based on the confidence level.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
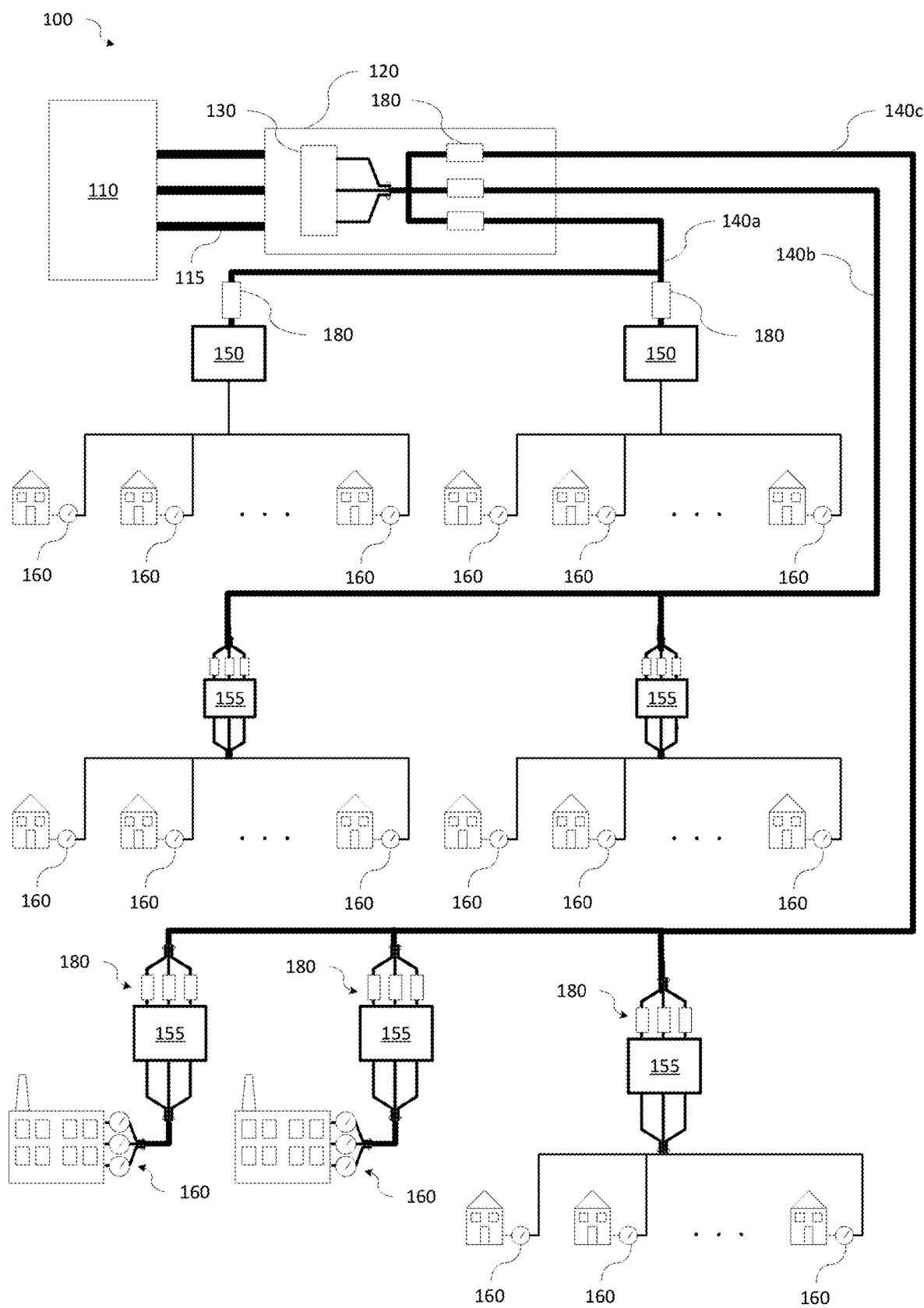
FIG. 1 is a block diagram illustrating an electrical power distribution system according to certain aspects of the present disclosure.

Systems and methods are provided for discovering or identifying topological and phase information of assets in an electrical power distribution system. For example, assets in the electrical power distribution system (e.g., meters, transformers, generators) that are equipped with sensors can be configured to collect sensor data (e.g., voltage, current, load impedance, temperature). Each asset can pre-process the sensor data before sending it to a headend system for topology and phase discovery. The pre-processing can include, for example, filtering the sensor data to remove or reduce noise or offset, transforming the sensor data into a frequency domain, or normalizing the sensor data to generate processed sensor data. In some cases, the pre-processing can include enhancing noise that represents unique characteristics or signature localized to a small population of meters. The pre-processing can further include detecting events such as disturbances or abnormalities in the sensor data and determine the characteristics of the events, such as the duration of the events, the number of events, the frequency of events, the time and severity of the events, and so on.

Based on the processed sensor data and the detected events, the asset can further generate descriptors. The descriptors can include, for example, value change descriptors describing value changes of sensor data, ranked descriptors identifying the maximum or minimum values in the sensor data, filtered descriptors including filtered values of the sensor data, event-based descriptors including the timing, frequency and magnitude of the events, ratio of frequency for different types of events, and so on. The generated descriptors are transmitted to the headend system for topology and phase discovery.

After receiving the descriptors from various assets in the electrical power distribution system, the headend system can perform clustering to group the assets into different segments and different phases. Reference assets with known phase ID and segment ID can be utilized to assign a specific phase ID and segment ID to an unknown asset. The determined assignment information can be transmitted to the individual assets for display or other uses. In addition, the timing information of the events contained in the descriptors can be utilized to synchronize the clocks of the various assets in the electrical power distribution system. In some implementations, assets in the network with spare computing and communication resources (e.g., edge processor) may act as an agent of the headend system to perform these operations in order to reduce communication traffic to the headend system and/or to reduce the computing load of the headend system.

The operations discussed above can be performed when the assets operate in a regular mode. In some scenarios, the assets can be configured to operate in a fast mode, where the identification of segments and phases can be performed in a shorter period of time than the regular mode. In the fast mode, an asset with an unknown segment or phase and its neighboring assets can be configured to generate fast descriptors based on processed sensor data without detecting events or based on minor events that occur continuously. The assets can send the fast descriptors to the headend system or an edge processor at a higher rate than the descriptors in the regular mode. Similarly, the headend system can determine the segment and phase assignment more quickly than the regular mode by performing correlations on the fast descriptors. The segment and phase assignment can be determined by utilizing the neighboring assets as reference assets.

Techniques described in the present disclosure increases the efficiency and accuracy of the segment and phase detection for assets in an electrical power distribution system and the communication between the assets and the headend system. By configuring the assets to generate and transmit the descriptors rather than the raw sensor data, the bandwidth consumption can be significantly reduced because the descriptors typically have a much smaller size than the raw sensor data. In addition, processing the sensor data locally at the asset allows each asset to identify the timing of the events and the relative timing of different events. This type of information enables more accurate grouping of assets than raw sensor data. In addition, with the timing information, the headend system can determine the offset of the clocks of the assets with respect to the clock of a high accuracy asset thereby performing high-accuracy time synchronization or adjustment among the assets.

Exemplary Operating Environment

FIG. 1 is a block diagram illustrating an electrical power distribution system 100 according to various aspects of the present disclosure. In FIG. 1, an electrical power generation facility 110 may generate electrical power. The generated electrical power may be, for example, 3-phase alternating current (AC) power. In a three-phase power supply system, three conductors each carry an alternating current of the same frequency and voltage amplitude relative to a common reference, but with a phase difference of one-third of a cycle between each. The electrical power may be transmitted at high voltage (e.g., around 140-750 kV) via transmission lines 115 to an electrical power substation 120.

At the electrical power substation 120 a step-down transformer 130 may step down the high voltage power to a voltage level more suitable for customer usage. The stepped down 3-phase power may be transmitted via feeders 140a, 140b, 140c to distribution transformers 150 which may further step down the voltage (e.g., 120-240V for residential customers). Each distribution transformer 150, 155 may deliver single-phase and/or 3-phase power to residential and/or commercial customers. From the distribution transformers 150, 155, electrical power is delivered to the customers through electric meters 160. The electric meters 160 may be supplied by the power utility company and may be connected between the loads (i.e., the customer premises)

and the distribution transformers 150, 155. Three-phase transformers 155 may deliver 3-phase power to customer premises, for example, by powering three lines on the street front. In some regions, to get single-phase power, a customer premises will be randomly connected to one of these lines. This random connection or tapping leads to the utilities losing track of what premises is on what phase. In addition to 3-phase power, single-phase power may be delivered from the distribution transformers 150 to various customers from different phases of the 3-phase power generated by the utility company resulting in uneven loading on the phases.

Sensors 180 may be distributed throughout the network at various assets, for example, but not limited to, feeder circuits, distribution transformers, etc. The sensors 180 may sense various circuit parameters, for example, frequency, voltage, current magnitude, and phase angle, to monitor the operation of the electrical power distribution system 100. It should be appreciated that the illustrated locations of the sensors in FIG. 1 are merely exemplary and that sensors may be disposed at other locations and that additional or fewer sensors may also be used.

As can be seen from FIG. 1, each asset is connected to one or more phases and one or more segments of the electrical power distribution system 100. The disclosure presented herein can automatically identify the segments and phases of the assets in the electrical power distribution system 100 and update such information as the topology and phase of the electrical power distribution system 100 change over time. The following description utilizes meters as an example of the assets. It should be understood that the described techniques also apply to other types of assets configured with sensors, such as transformers, generators, contactors, reclosers, fuses, switches, street lighting, ripple receivers, ripple generators, capacitor banks, batteries, synchronous condensers, etc. These assets including the meters are collectedly referred to herein as "utility devices."

Figure 2:
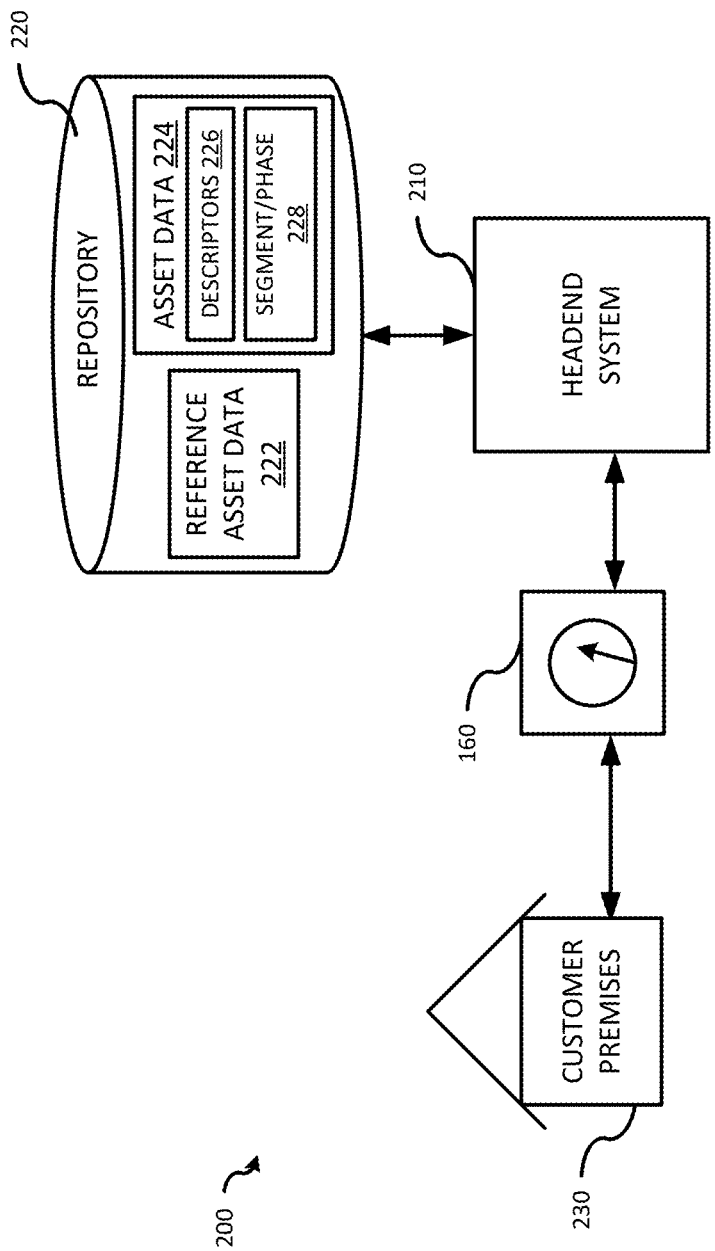
FIG. 2 is a diagram showing a utility management system through which meters in an electrical power distribution system can communicate with a headend system to facilitate the discovery of the topology and phase of the electrical power distribution system, according to certain aspects of the disclosure.

FIG. 2 is a diagram illustrating a utility management system 200 according to various aspects of the present disclosure. The utility management system 200 may include an electric meter 160 (or a meter 160 in short), a headend system 210, and a repository 220. While FIG. 2 illustrates one electric meter 160 for ease of explanation, it should be appreciated that a plurality of electric meters 160 may be included in the utility management system 200.

The electric meter 160 may monitor and/or record various characteristics associated with the electrical power distribution system such as the voltage, the current, the energy usage at the customer premises 230, source impedance and load impedance, and communicate the information to the headend system 210. For example, the electric meter 160 may continually monitor and record the voltage variation at the customer premises 230, and days of the week and times of the day related to voltage variation at the customer premises 230 and communicate the information to the headend system 210. In addition, the electric meter 160 may perform as a sensor to detect and/or record abnormal measurements and/or events. It should be appreciated that other information, for example, but not limited to, average power consumed, peak power, etc., may be monitored and communicated by the electric meter 160.

The electric meter 160 may communicate with the headend system 210 via wired or wireless communication interfaces using communication protocols appropriate to the specific communication interface. Different wired or wireless communication interfaces and associated communication protocols may be implemented on the electric meter 160 for communication with the headend system 210. For example, in some cases, a wired communication interface may be implemented, while in other cases a wireless communication interface may be implemented for communication between the electric meter 160 and the headend system 210. In some examples, a wireless mesh network may connect the electric meters 160. The electric meters 160 may transmit data to a collector (not shown) that communicates with another network to transmit the data to the headend system 210. The collector can also act as an edge processor to process data transmitted from the meters 160 (e.g., the descriptors) to shift some processing load from the headend system especially in a fast mode as described below. The electric meters 160 may use radio frequency (RF), cellular, or power line communication to communicate. It should be appreciated that other communication methods may also be used.

The communication network connecting the electric meter 160 and the headend system 210 as discussed above can be used for transmitting data for topology and phase identification (e.g., the descriptors discussed below). The communication network can also be used to provide other types of communications from the electric meter 160 to the headend system 210, such as those used for reporting power consumption. In some examples, the communication network connecting the electric meter 160 and the headend system 210 as discussed above can overlay the electrical power distribution network shown FIG. 1. For wireless communications, the neighboring meters in the communication network may differ from the neighboring meters in the distribution network.

The headend system 210 may also communicate with the repository 220 via wired or wireless communication interfaces. The repository 220 may be implemented using, for example, but not limited to, one or more hard-disk drives, solid-state memory devices, or other computer-readable storage media. Other storage configurations may also be used. The repository 220 may be configured to store various data related to the meters 160 and other assets in the electrical power distribution system 100. For example, the repository 220 may include descriptors 226 transmitted by each of the assets, the determined segment and phase 228 for each asset, and so on.

The repository 220 may further include reference asset data 222 describing the information associated with reference assets that have known segment information or phase information or both. In some examples, the segment and phase information is represented using segment identifiers (IDs) and phase identifiers (IDs) that uniquely represent individual segments and phases. Any assets that share the same phase or segment ID but have an unknown phase or network segment can have their phase or network segment inferred by the headend system 210. The known phases and segments of the reference assets may be "out of band information" that is set by processes other than the automated network topology discovery described herein. In some examples, the majority of assets may have known phase and/or segment due to a large volume of out of band information being loaded. The process presented herein can be used to validate that data and flag any inconsistencies.

Various other information related to assets in the electrical power distribution system 100 may be included in the repository 220, such as the parameters generated for a segment or an asset. For instance, a segment object may be created when the headend system 210 determines that a unique segment is likely to exist. Segment parameters such as phase ID, segment ID, segment type ID can be created and associated with the segment.

Figure 3:
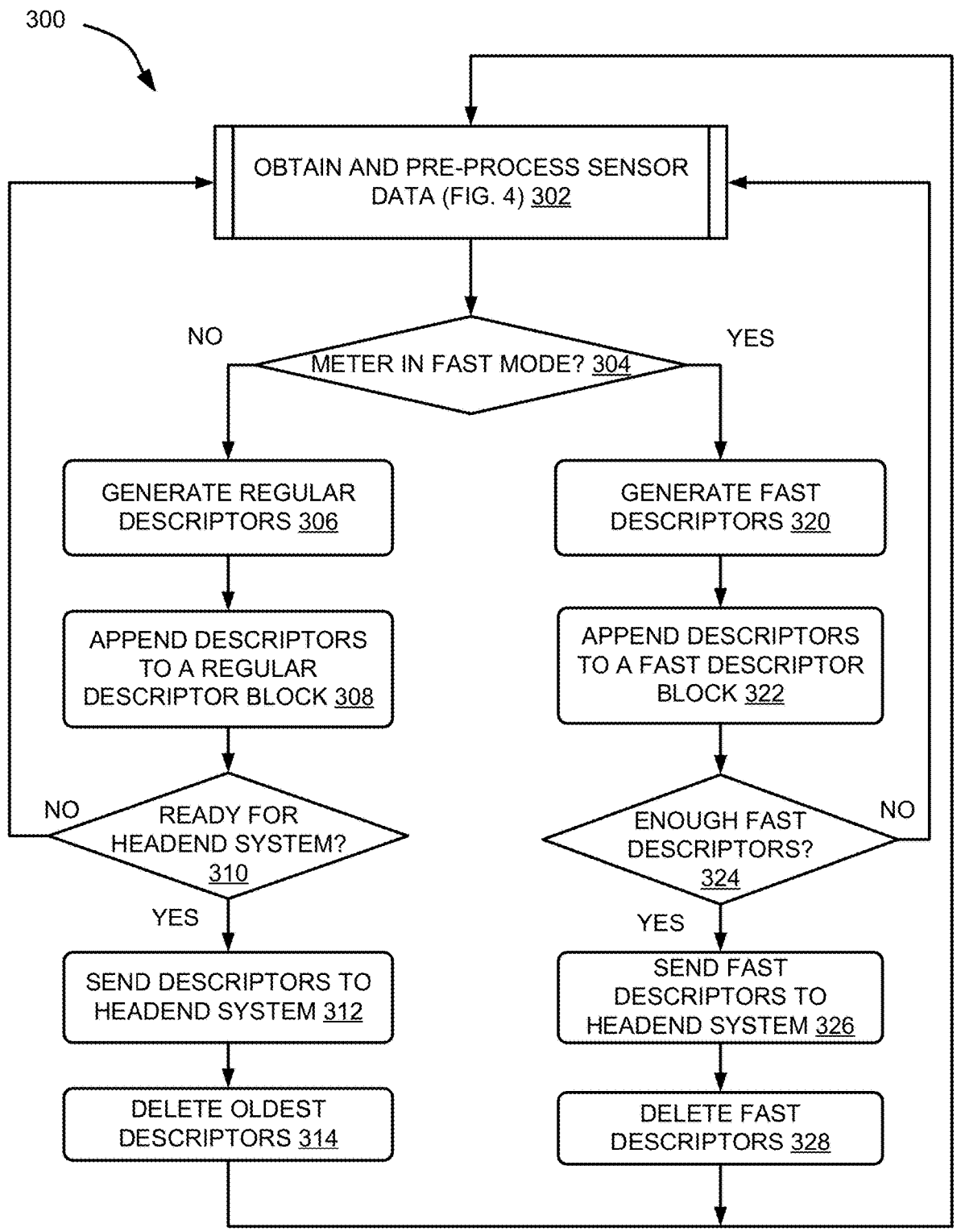
FIG. 3 is an example of a process for generating descriptors at a meter of the electrical power distribution system to facilitate the topology and phase discovery by the headend system, according to certain aspects of the disclosure.

Referring now to FIG. 3, FIG. 3 illustrates an example of a process for generating descriptors 226 by a meter 160 of the electrical power distribution system 100 to facilitate the topology and phase discovery by the headend system 210, according to certain aspects of the disclosure. The meter 160 can implement operations depicted in FIG. 3 by executing suitable program code. For illustrative purposes, the process 300 is described with reference to certain examples depicted in the figures. Other implementations, however, are possible.

At block 302, the process 300 involves obtaining and pre-processing sensor data at the meter 160 or other assets. Depending on the type of the asset and the sensors installed on the asset, the sensor data may include, but are not limited to, supply voltage, current, power, source impedance, load impedance, temperature, light levels, humidity, pressure, sound, vibration, and other distribution network or environmental quantities. Pre-processing sensor data can include filtering and normalizing the sensor data to remove or reduce noise, offset, etc. to generate processed sensor data. The pre-processing can further include detecting events such as disturbance or abnormalities in the sensor data and determine the characteristics of the events, such as the duration of the events, the number of events, the time and severity of the events, and so on. For meter 160, the sensor data can include the power voltage, current, power usage and so on. Additional details about obtaining and pre-processing sensor data are presented below with regard to FIG. 4.

At block 304, the process 300 involves determining whether meter 160 is in a fast mode. When the meter 160 is in the fast mode, the meter 160 can generate and transmit descriptors (also referred to as "fast descriptors") to the headend system 210 at a higher rate than the regular mode so that the segment or the phase of the meter 160 can be identified by the headend system 210 within a short time duration. If the meter 160 is not in the fast mode, i.e., the meter 160 operates in a regular mode, the meter 160 can generate the descriptors 226 (also referred to as "regular descriptors") at a normal rate.

If it is determined that the meter 160 is in the regular mode, the process 300 involves generating regular descriptors 226 based on the processed sensor data. The meter 160 can be configured to generate a set of regular descriptors 226 over a descriptor interval, such as 30 minutes, an hour, or two hours. The regular descriptors 226 can be generated to include the filtered or normalized sensor data, the detected events, and the characteristics associated with the events. In some examples, descriptors 226 can include vectors or scaler values that describe the sensor data and the detected events.

The meter 160 can be configured to generate and transmit different types of descriptors, including, but not limited to, raw descriptors, raw statistic descriptors, normalized change descriptors, ranked descriptors, filtered descriptors, disturbance characterization descriptors, distribution characterization descriptors, signal frequency analysis descriptors, event timing analysis descriptors, event frequency analysis descriptors, event magnitude analysis descriptors, and so on.

For example, raw descriptors can include descriptors with little pre-processing requirements. Raw descriptors are typically not transmitted to the headend system 210 in the regular mode due to the high bandwidth consumption and limited contribution to the grouping process performed at the headend system 210. In some examples, the sensor data in the raw descriptors are not normalized. Rather, the values of the sensor data can be raw values and can include average values over a descriptor interval. Raw descriptors can include average root-mean-square (RMS) voltage during the interval, average voltage unbalance during the interval, average supply impedance, average temperature, average light level, average load impedance, average exported power, average vibration, instantaneous communication channel address or name, and so on.

Raw statistic descriptors can provide standard statistical quantities of the sensor data such as the maximum, minimum, median, range, standard deviation, variance, etc. The raw statistic descriptors can be determined based on raw values of the sensor data rather than normalized values. The raw statistic descriptors are often not transmitted to the headend system 210 during the regular mode.

Normalized change descriptors can represent changes in an underlying quantity. In this type of descriptors, the value of the sensor data is normalized or scaled using the average of the quantity of the sensor data from a prior descriptor interval. The normalized change descriptors can include normalized maximum RMS positive voltage change for a metrology window associated with the meter 160, the normalized maximum RMS positive voltage change for a half cycle of the meter 160, the normalized maximum positive voltage change for a single sample, the normalized minimum RMS negative voltage change for a metrology window, and the change in supply frequency. Often a normalized maximum value is transmitted to the headend system 210 in the regular mode.

Ranked descriptors can include values such as the Nth highest maximum or the Nth lowest minimum value for a quantity during the interval period. A single Nth maximum or minimum or series of N highest or lowest values can be included in the descriptors 226 and transmitted to the headend system 210. Examples of ranked descriptors include, but are not limited to, normalized Nth highest maximum RMS voltage change for a metrology window, normalized Nth highest maximum RMS voltage change for a half cycle, and normalized Nth highest maximum voltage change for a single sample.

Filtered descriptors can include values generated by applying digital filters on the sensor data. Examples of filtered descriptors include, but are not limited to, normalized maximum RMS positive voltage change for a single sample filtered to exclude impulses, normalized maximum RMS positive voltage change for a single sample filtered to exclude fundamental mains frequency, normalized Nth highest maximum RMS voltage change for a metrology window filtered over a period of time (e.g., one minute), normalized Nth highest maximum RMS voltage change for a metrology window filtered over a period of time (e.g., 5 minutes). Filters can also include finite impulse response (FIR) and infinite impulse response (IIR) digital filters to form a band pass, low pass, high pass, or notch filter, amongst others. These filters may operate on high rate raw samples ~1000 Hz or low rate processed metrology output ~1 Hz.

Event characterization descriptors include descriptors that characterize properties of an event such as a disturbance or an abnormality. For example, the largest disturbance in a descriptor interval can be analyzed and included as the value of the event characterization descriptor. Examples of event characterization descriptors can include, but are not limited to, the duration of a ringing disturbance, the frequency of a ringing disturbance, the normalized peak magnitude of a ringing disturbance, the normalized magnitude of an impulse, the normalized magnitude of a step change in voltage, the phase of a step change in voltage, the duration of a short term voltage excursion, the normalized voltage change of a short term voltage excursion and so on.

Distribution descriptors can characterize a signal in the sensor data in the form of a distribution of the samples into N distinct categories. Normalization can be performed so that the number of distinct values is within a range, such as 5 to 10. A distribution descriptor may be the number of samples in a particular category or statistical properties of the distribution such as the median or the average. Examples of distribution descriptors may include the total number of samples that reside within one of the N distinct categories of the normalized voltage magnitude, the total number of samples that reside within one of the M distinct categories for the normalized voltage magnitude changes, or the average duration of persistence for voltage magnitude to reside within one of the N distinct categories of voltage magnitude.

Signal frequency analysis descriptors can be used to describe the frequency components in the sensor data. For example, a fast Fourier transform (FFT) can be employed to determine frequency components of the sensor data. Examples of the signal frequency analysis descriptors can include, but are not limited to, normalized magnitude and frequency of the second largest frequency detected within a metrology window over an interval period, the frequency of the largest frequency detected in the longest running ringing disturbance, the frequency of the largest frequency detected in RMS voltage samples over an interval period, the frequency and magnitude of the longest running disturbance with a magnitude of more than p % of nominal voltage (e.g., p=2), the total harmonic distortion (THD) of the sensor data, the changes in THD, the magnitude changes in the most prominent harmonic and so on.

Event timing analysis descriptors, event frequency analysis descriptors, event magnitude analysis descriptors characterize different classes of events. Examples of these types of descriptors include the time of an event, the time when output of one filter becomes higher or equal to another filter output (e.g., one-minute moving average crosses five-minute moving average of RMS voltage), the duration between two events, the average duration between multiple events of the same type, the minimum/maximum/median/variance of magnitude/duration/time/frequency of multiple events of the same type, the number of times a threshold has been breached, the number of times a value falls within a valid range, and the magnitude of a filter quantity when other quantity crosses a threshold. Other examples may include, for the N highest maximum differences in RMS values, the period between the adjacent occurrences, the normalized magnitudes for the N highest maximum differences RMS values, and the cumulative sum of voltage magnitudes for all breach events. It should be noted that the time mentioned above can be either relative to an absolute time scale or relative to the time of occurrence of some other event. Absolute timing may require an accurate timekeeper, whereas timing relative to some other event does not require an accurate timekeeper.

These types of descriptors are not mutually exclusive and a descriptor may be classified as more than one type. In addition, a meter 160 may be configured to generate and transmit a range of descriptors at each interval according to a descriptor configuration. For example, for an asset with polyphase supply and current measurement capability, the descriptor configuration may include the average RMS voltage during the interval, the average voltage unbalance during the interval, the average supply impedance, the periods between the M longest intervals where no crossover of the one-minute and five-minute moving average occurred, the count of the number of one-minute and five-minute cross-overs, the count of the number of voltage changes exceeding 10% of the previous intervals average RMS voltage, the time between zero crossing and onset of the largest synchronizing event, the number of ripple telegram pulses, and the average duration of persistence for voltage magnitude to reside within one of 10 distinct categories of voltage magnitude.

At block 308, the process 300 involves appending the generated regular descriptors to a regular descriptor block. In some examples, the regular descriptors can be organized in terms of regular descriptor blocks with a fixed size. Newly generated descriptors can be appended to the current descriptor block until the descriptor block is full. The descriptor block full of regular descriptors may then be appended to a descriptor profile associated with the meter 160. The descriptor profile can be configured to maintain the regular descriptor blocks to be transmitted to the headend system 210 and regular descriptor blocks recently transmitted to the headend system 210. In other implementations, the regular descriptors are maintained in the descriptor profile without involving the descriptor blocks.

At block 310, the process 300 involves determining whether the generated regular descriptors are ready for transmission to the headend system 210. In some examples, the regular descriptors are ready for transmission to the headend system 210 when there are more than K descriptor blocks in the descriptor profile and K is a natural number. In other examples, the regular descriptors are ready for transmission to the headend system 210 if regular descriptors for L descriptor intervals have been generated. For example, the meter 160 can be configured to transmit the regular descriptors of every 4 descriptor intervals at once to the headend system 210. Other criteria may be utilized to determine whether the regular descriptors can be transmitted to the headend system 210. At block 312, the process 300 involves sending the regular descriptors, such as the oldest N descriptor blocks in the descriptor profile or the descriptors in the past L descriptor intervals, to the headend system 210. At block 314, the process 300 involves deleting the oldest descriptors in the descriptor profile, such as the descriptors that were sent at block 312, to free up the storage space for new descriptors. The process 300 then returns to block 302 to collect more sensor data for generating new descriptors.

If, at block 304, it is determined that the meter 160 is in the fast mode, the process 300 involves generating fast descriptors at block 320. In some cases, the meter 160 may be manually configured to operate in the fast mode. For example, a technician may install a new meter or repair an existing meter at customer premises 230 and need to quickly determine the segment and phase identifiers of the new meter or the existing meter. To obtain such information, the technician may configure the meter with unknown or unverified segment and phase identifiers (also referred to as an "unknown meter") through a user input to operate in the fast mode. In addition, the technician may further configure the neighboring meters of the unknown meter having known segment or phase information to operate in the fast mode. These neighboring meters can be used as reference meters during the phase and segment identification process. In other examples, the headend system 210 may send instructions to the unknown meter and its neighboring meters to operate in the fast mode in order to determine the segment and phase of the unknown meter within a short period of time in response to the request of the technician or other action initiated at the headend.

To speed up the process, the fast descriptors can be generated and transmitted to the headend system 210 at a higher rate than the regular descriptors, such as twice a minute. In this way, the headend system 210 can determine the phase and segment of the unknown meter and provide that information back to the meter and/or the technician on-site in near real-time. The fast descriptors can include data or descriptors that require less computational resources such as the raw descriptors or raw statistic descriptors where no time-consuming processing such as the FFT are involved. Also, when generating the fast descriptors, the meter does not need to wait for coincidental supply abnormalities. However, due to a potential lack of time synchronization between the meters, the headend system may need to perform additional processing in the form of time correlation of fast descriptors from multiple meters.

At block 322, the process 300 involves appending the fast descriptors to a fast descriptor block or other types of data structures. At block 324, the process 300 involves determining if sufficient fast descriptors are generated, for example, a pre-determined number of fast descriptors have been generated, the fast descriptor block is full, or fast descriptors for a fast mode interval have been generated. If not, the process 300 involves obtaining more sensor data at block 302 for generating additional fast descriptors. If sufficient fast descriptors have been generated, the process 300 involves, at block 326, sending the generated fast descriptors to the headend system 210. In some examples, the fast mode interval is much shorter than the descriptor interval in the regular mode. At block 328, the process 300 involves deleting the fast descriptors to free up space for new descriptors. The process further involves obtaining additional sensor data at block 302.

Figure 4:
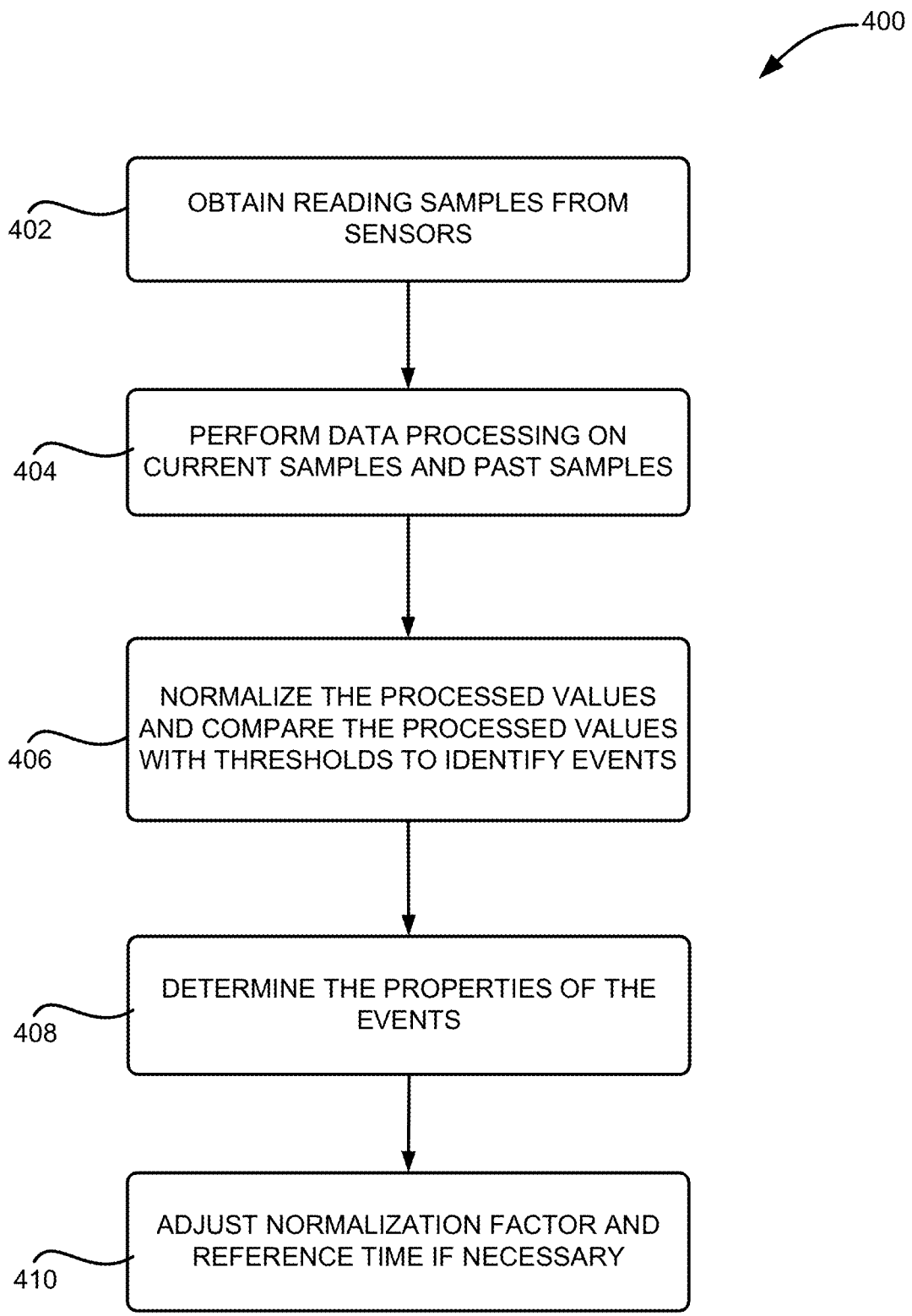
FIG. 4 is an example of a process for processing sensor data at a meter of the electrical power distribution system, according to certain aspects of the disclosure.

Referring now to FIG. 4, FIG. 4 illustrates an example of a process for processing sensor data at a meter 160 of the electrical power distribution system 100, according to certain aspects of the disclosure. The meter 160 can implement operations depicted in FIG. 4 by executing suitable program code. For illustrative purposes, the process 400 is described with reference to certain examples depicted in the figures. Other implementations, however, are possible.

At block 402, the process 400 involves obtaining reading samples from the sensors associated with the meter 160 and configured to measure and produce sensor data. At block 404, the process 400 involves performing data processing on the current samples and past samples. Examples of the pre-processing include, but are not limited to, statistical processing, mathematical operations, and digital signal processing (DSP). The statistical processing can include determining, for example, instantaneous value, the maximum value, the minimum value, the average value, the median value, the range of the values, the standard deviation, the ranked list N maximum/minimum values, and the sample count. The mathematical operations can include RMS operations, dedifferentiation, and/or integration. The DSP operations may include FFT, finite impulse response filters (FIR), infinite impulse response filters (IIR), wavelet transform, normalization, and/or resampling.

At block 406, the process 400 involves normalizing the processed values and identifying events, such as disturbance or abnormalities. The normalization can be performed by, for example, dividing the processed values by the average voltage magnitude from the prior descriptor interval. Identifying the events can be performed by comparing the processed values with one or more thresholds or matching the values to a reference value. A threshold may be a fixed static value, a configurable threshold controlled by, for example, the headend system 210, or a dynamic variable which is a function of the sensor data itself (e.g., the instantaneous sensor value could be compared to a short term average of the sensor values). If the processed values are higher than a corresponding threshold (or lower than the threshold depending on the type of the threshold), outside a valid range, or match a reference value, an event can be identified. For instance, if an average voltage value is higher than a high threshold value of voltage, lower than a low threshold value of voltage, or outside a valid range, a voltage abnormality event can be identified. Multiple events can be identified similarly.

At block 408, the process 400 involves determining the characteristics or properties of the identified events. For example, the characteristics of an event can include the time of the occurrence of the event, the severity of disturbance in the event (e.g., measured by the amount of the processed value exceeding the threshold value or deviated from the valid range), the number of events in a class of events, the time intervals between various events, and so on. These characteristics of the events can be associated with the respective events and used by the meter 160 to generate descriptors as described above with regard to FIG. 3.

At block 410, the process 400 involves adjusting the normalization factor and reference time. For instance, the normalization may be performed based on an average value and the standard deviation of the sensor data. The average value can be updated to include new sensor data as more sensor data are collected. The standard deviation can be updated similarly. In addition, if the meter 160 is instructed by the headend system 210 to adjust the reference time, the meter 160 can further perform the reference time adjustment during the pre-processing.

In some examples, the meter 160 can further perform timing analysis related to the events during the pre-processing. The timing analysis may include recording the time of the event and/or the elapsed time since a previous event. Determining and reporting the time duration between events rather than the time of events can be beneficial because the time duration between events does not require precise time synchronization among meters 160. In other words, the relative time between events is insensitive to timing inaccuracies of the meters themselves and the headend system 210.

Pre-processing sensor data can reduce the size of data transmitted to the headend system 210. Compared with the raw sensor data rate which in some systems is about 13 k bytes/hour or 32 M bytes/hour, this descriptor data can have a relatively low data rate at around 50 bytes/hour. Pre-processing can thus provide the benefit of allowing high bandwidth data to be processed without having to send it over a communications channel to the headend system 210, thereby reducing the network bandwidth consumption.

Figure 5:
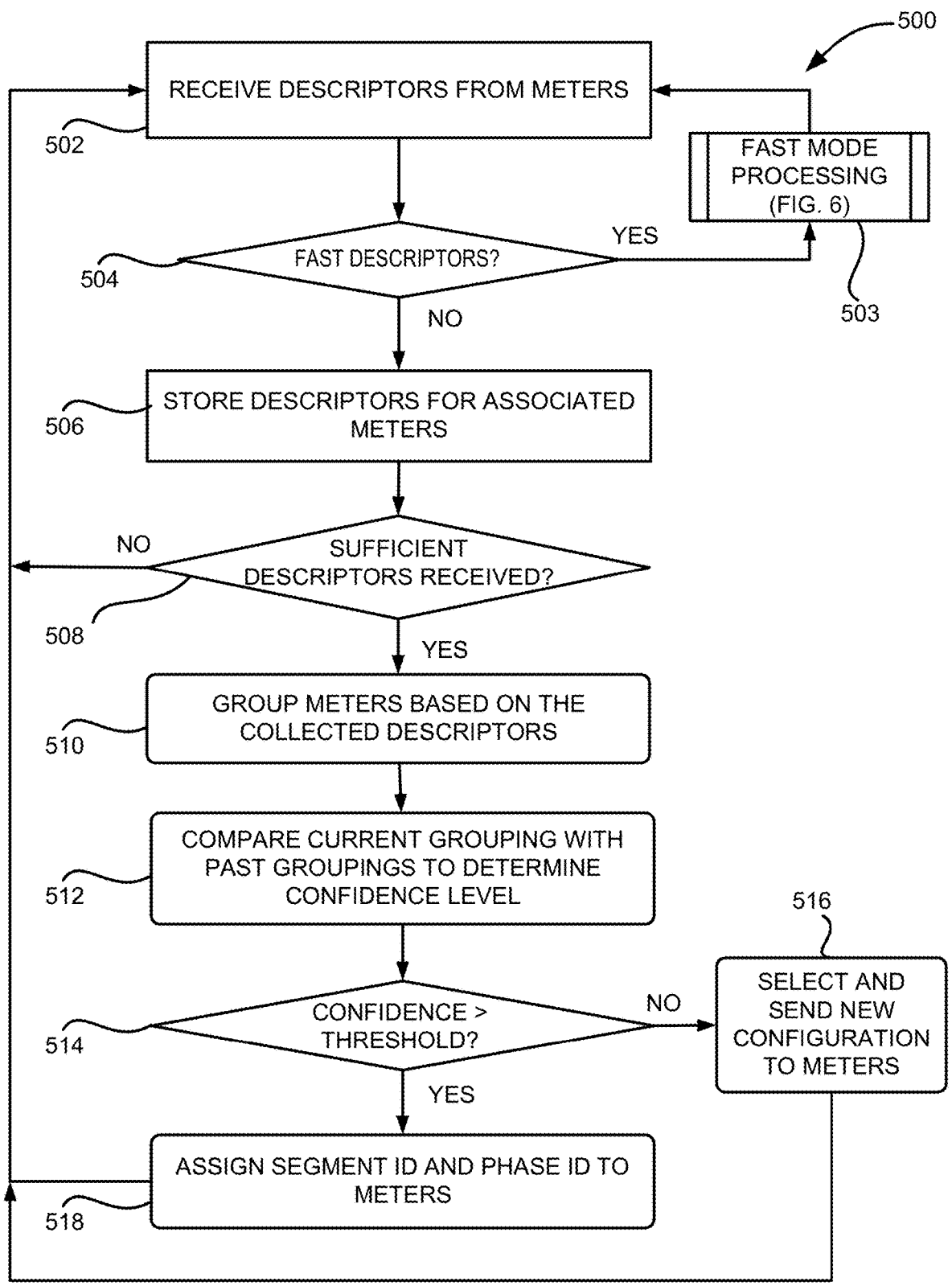
FIG. 5 is an example of a process for identifying the topology and phase of the electrical power distribution system, according to certain aspects of the disclosure.

Referring now to FIG. 5, FIG. 5 illustrates an example of a process 500 for identifying the topology and phase of the electrical power distribution system 100, according to certain aspects of the disclosure. The headend system 210 can implement operations depicted in FIG. 5 by executing suitable program code in the meter 160. For illustrative purposes, the process 500 is described with reference to certain examples depicted in the figures. Other implementations, however, are possible.

At block 502, the process 500 involves receiving descriptors from the meters 160 in the electrical power distribution system 100. Depending on the operation modes of the meters 160 in the electrical power distribution system 100, the descriptors may be received from a small set of meters 160 that are configured to operate in the fast mode or the meters 160 in the electrical power distribution system 100 that are configured to operate in the regular mode. At block 504, the process 500 involves determining whether the received descriptors are fast descriptors. In some examples, the fast descriptors can include a flag indicating that the descriptors are generated by the meter 160 while operating in the fast mode. The headend system 210 can determine whether the received descriptors are fast descriptors by detecting the flag. In other examples, the headend system 210 can determine the descriptors as fast descriptors based on the size and frequency of receiving the descriptors. For instance, the fast descriptors can be transmitted using a smaller sized packet and are transmitted at a higher frequency.

If the headend system 210 determines that the descriptors are fast descriptors, process 500 involves performing fast mode processing. Details about the fast mode processing are provided below with regard to FIG. 6. If the headend system 210 determines that the descriptors are not fast descriptors, process 500 involves performing regular mode processing starting from block 506. At block 506, the headend system 210 can store the received descriptors for the associated meters 160. At block 508, the headend system 210 can determine if a sufficient number of descriptors have been received (e.g., the number of received descriptors exceeds a threshold number of descriptors). In some implementations, the headend system 210 is configured to identify the segment and phase of the meters interval by interval. In other words, the headend system 210 identifies the segment and phase based on descriptors collected during the entirety of a detection interval. The detection interval can be set to an integer number of the descriptor intervals (e.g., 4 hours or 8 hours for a descriptor interval of 1 hour).

If the number of received descriptors is insufficient, the process 500 involves receiving more descriptors at block 502. If a sufficient number of descriptors have been received, the process 500 involves, at block 510, grouping the meters 160 based on the received descriptors, such as the received descriptors for the current detection interval. The grouping may be performed using, for example, K-means clustering, K-medoids clustering (PAM), hierarchical clustering, fuzzy clustering, model-based clustering, density-based clustering, hybrid clustering, and so on. The headend system 210 can assesses clustering tendency, determine the number of clusters and evaluate the cluster quality. The grouping or clustering results can be used to automatically tailor the clustering methods used to group the descriptors.

At block 512, the process 500 involves comparing the current grouping with past groupings to determine a confidence level of the grouping. For example, if the current grouping is consistent with the past groupings (e.g., the same meter is constantly grouped into the same group), the quality of the grouping can be determined to be high and a high confidence level can be assigned to the grouping; otherwise, a low confidence level is assigned.

In some examples, the confidence level may be determined based on groupings using different types of descriptors. As discussed above, the meters 160 may generate and send multiple descriptors of different types based on a descriptor configuration. For each descriptor type, the headend system 210 can perform the clustering to assign the meters to a number of groups. Groups for one type of descriptors may overlap with groups of another type which forms a union. This union may contain a population of meters that are connected to the same segment. However, this union may contain meters which do not belong to the same segment or omit meters that should be included. This problem can be mitigated by determining and comparing the unions over multiple detection intervals. If a meter is present in the same union for the majority of cases spanning multiple detection intervals, it may be declared as belonging to the segment associated with the union. Such grouping may be assigned a high confidence level. Otherwise, a low confidence level is assigned.

At block 514, the process 500 involves comparing the confidence level with a threshold value of confidence. If the confidence level exceeds the threshold value, the meters can be determined to be belonging to the determined group, and the segment ID and phase ID of the reference meter in that group can be assigned to the meters in that group as shown in block 518. If the confidence level does not exceed the threshold value, the headend system 210 can select and send a new descriptor configuration to the meters 160 at block 516 so that the meters 160 can generate a different set of descriptors to increase the confidence level of the grouping. For example, if an existing descriptor configuration without the signal frequency descriptors cannot provide a confidence level exceeding the threshold value, the headend system 210 can select a new descriptor configuration to include one or more signal frequency descriptors. The headend system 210 can select this new descriptor configuration if disturbances with certain frequencies have been observed in the electrical power distribution system 100. The descriptor configurations may be selected differently for meters 160 in different locations of the electrical power distribution system 100. In this way, the headend system 210 can tailor the descriptors sent by the meters 160 to match the type of electricity network disturbances and parameters that are prevalent at a given time and/or at a given point in the electrical power distribution system 100. When descriptors are selected correctly, there will be a high signal to noise ratio of descriptor values and clustering quality can be improved. The process 500 may then proceed to block 502 to receive additional descriptors. In some examples, block 516 may be performed after multiple rounds of operations and determinations that the confidence level of the grouping is lower than the threshold. At that point, the headend system 210 can be configured to generate and send the new descriptor configuration to the meters 160. In some examples, if after multiple iterations none of the neighboring meters have a phase ID and segment ID, then a new phase ID and segment ID may be created and assigned to the meter. Similarly, a new phase ID and segment ID may be created and assigned to the meter if no neighboring meters are found.

In some implementations, after meters have been identified and classified, the headend system 210 may instruct the meters 160 to disable or reduce descriptor transmission activity to reduce communication network bandwidth consumption. The headend system 210 may elect to do so for unclassified meters too so that the headend system 210 can focus its computing efforts for a particular region in the electrical power distribution system 100. In further implementations, the headend system 210 may temporarily disable descriptor generation and transmission behavior in all or some of the meters so that other functions of the meters can take priority or to avoid collecting data at times known to be erroneous.

Figure 6:
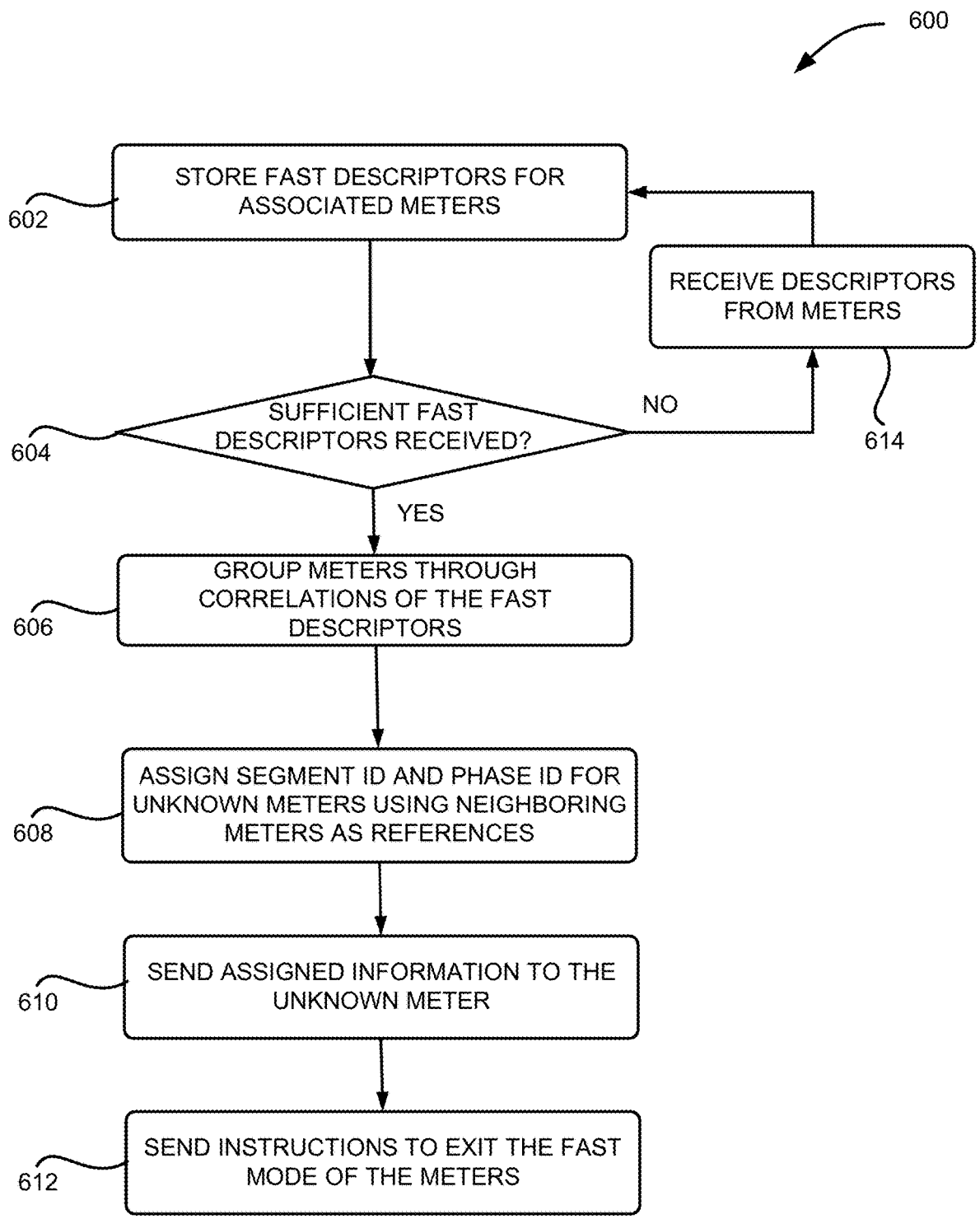
FIG. 6 is an example of a fast mode process for identifying the topology and phase of the electrical power distribution system, according to certain aspects of the disclosure.

Referring now to FIG. 6, FIG. 6 illustrates an example of a fast mode process 600 for identifying the topology and phases of the electrical power distribution system 100, according to certain aspects of the disclosure. The headend system 210 can implement operations depicted in FIG. 6 by executing suitable program code. For illustrative purposes, process 600 is described with reference to certain examples depicted in the figures. Other implementations, however, are possible.

At block 602, the process 600 involves storing the received fast descriptors for the associated meters. At block 604, the process 600 involves determining if sufficient fast descriptors have been received. For example, the headend system 210 can be configured to identify segments and phases of meters for every Y fast intervals and Y is a positive integer. The fast interval is much shorter than the detection interval for the regular mode discussed above with regard to block 508 in FIG. 5. For example, the fast interval can be set to one minute, 30 seconds or even shorter. If the fast descriptors for the past Y fast interval have not been received, the process 600 proceeds to block 614 to collect more fast descriptors (which can be block 502 of FIG. 5). If the fast descriptors for the past Y fast interval have been received, the process 600 involves, at block 606, grouping the meters by performing correlations between the fast descriptors of the meters operating in the fast mode. Because of the short interval for collecting sensor data from the meter, fast descriptors might not contain events such as disturbance and abnormality as the regular descriptors. Rather, the fast descriptors mostly contain small variations of values of sensor data, such as the voltage changes or variations of total harmonic distortion (THD), temperature, source impedance, current, etc. For this type of data, correlation-based grouping can provide more accurate grouping results.

At block 608, the process 600 involves assigning segment ID and/or phase ID to the unknown meter. For example, the segment ID and/or phase ID of the neighboring meters in the same group as the unknown meter can be assigned to the unknown meter. The assigned segment ID and/or phase ID can be stored in the asset data 224 of the repository 220. At block 610, the process 600 involves sending the assigned information to the unknown meters. The unknown meters can display the assigned information on a display device. In the example where the meters were configured in the fast mode by a technician on-site, the technician can read the assigned information and proceed with the installation or repair procedure accordingly. Alternatively, or additionally, the assignment information of the meters can be obtained from the headend system 210 when needed. At block 612, the process 600 involves sending instructions to the meters to exit the fast mode. The meters may then generate and transmit the descriptors in the regular mode as described above with respect to FIGS. 3 and 4. In some examples, the meters can exit the fast mode by receiving instructions through a user input at the respective meters.

It should be understood that while the above disclosure focuses on meters, the operations performed by the meters for generating descriptors can be performed by other types of assets to facilitate the phase and segment operation of the assets. Further, if there is no reference asset information for assigning phase ID and segment ID, the headend system 210 can generate or create different phase IDs and/or segment IDs for the different groups of assets so that the different groups of assets can be distinguished from each other.

It should be further appreciated that while the above disclosure focuses on a single headend system 210 receiving all the descriptors, other arrangements are possible. For example, the electrical power distribution system 100 may be split into individual zones where each zone has its own dedicated headend system. The zone headend system may have no relationship with any other headend system or it may coordinate activities with other headend systems. In a multi-headend environment, there may be a hierarchical arrangement where a single top-level headend system coordinates activities of all other zone headend systems. Each zone headend system may take on the role of processing the bulk of descriptor data and forward limited descriptor data to the top-level headend system. In this way, data processing requirements of any single headend system can be limited and the bandwidth requirements can be reduced. A zone headend system may optionally be activated to process fast descriptor data from nearby assets. In certain examples, edge processors can be employed to process the descriptors in individual zones and to forward the processed descriptor data to the top-level headend system.

Further, as discussed above, the descriptors transmitted to the headend system 210 are not stored on a permanent basis at the meter 160. In some examples, only data used to make the current determination about which segments are associated with which assets are stored. This data is continually refreshed and old data is continually deleted. For example, descriptors from the last N intervals are stored (e.g., N ranges from 10 to 200). Additionally, descriptors from assets for intervals around different classes of critical events may be stored. Critical events can include rare disturbances on the electrical power distribution system that are detected by a large number of assets. For each critical event, the interval before, during and after the event can be stored and intervals for the last M critical events for each class are stored (e.g., M=10).

As discussed above, the meters generate descriptors over several time intervals and the headend system 210 performs the identification based on the descriptors over these time intervals. This requires time synchronization across all assets sending descriptors to the headend system 210. In some electrical power distribution system 100, the time error may be as high as +/−2 minutes. Timing inaccuracy will have a negative impact on grouping activities performed in the headend system 210 due to descriptors having different values that would otherwise be identical. To mitigate this problem, time intervals can be selected to be large relative to the amount of time error. For example, one-hour intervals can be selected to overcome the 2-minute timing error.

This mechanism, however, might not work for the fast mode where a small number of physically nearby assets for a short duration send short interval data (e.g., approximately 10 seconds). For these cases, the headend system 210 can perform correlation operations across multiple time intervals on a limited number of descriptors to determine the time offset of each asset. The assets sensors would have experienced similar electrical noise so those patterns can be used as synchronizing events detectable using correlation. Once time offset is known for each asset, the descriptor grouping process described above can be carried out.

The disclosure presented herein can also be used to synchronize the clocks of the assets in the electrical power distribution system 100. Depending on the hardware capabilities of an asset, sub-cycle (e.g., 20 ms @ 50 Hz) pre-processing may be possible in highly capable assets. Short duration disturbances like high-frequency ringing or large voltage variations for a few milliseconds can thus be detected by these assets. Although there might be propagation delays due to transmission lines, transformers and capacitor banks, assets in a small area can be assumed to have identical detection time for these types of events. Such events can thus be utilized to synchronize the clocks among multiple assets that have detected the event with an accuracy close to the sensor sampling period (e.g., +1-2 ms). For example, these synchronizing events can be included in the descriptors so that the headend system 210 can identify these synchronizing events and use the time of occurrence of the synchronizing events as a reference time for all other events in the descriptors received by the headend system 210 to adjust the timing of those events so that all the events are synchronized. The headend system 210 can further calculate the time offset of each asset from a reference clock and send the time correction instruction to these assets to correct their respective clocks. Alternatively or additionally, the headend system 210 can send the reference time of the synchronizing event to the assets. The assets can determine the difference between the reference time and the respective time when they observed the synchronizing event. The assets can then adjust their local clocks based on the difference.

Longer duration synchronizing events may exist in the form of high-frequency tones or pulses that are conducted disturbances superimposed on top of the mains voltage. Tones have longer durations (e.g., longer 50 ms-5000 ms) of the disturbance than pulses (e.g., shorter than 50 ms). Pulses may suffer mores attenuation compared to tones due to impedance and filtering delay. These may be unintentional events from sources like grid-connected inverters, variable speed drives and switch-mode power supplies or intentional events such as injected ripple telegrams for load control. A series of pulses or tones may persist for only a few milliseconds, 10s of seconds (for the case of a ripple telegram) or even continuous (for the case where equipment is faulty). These signals may last for several mains cycles. The time to detect these events may be long due to filtering delays within the meter itself, but synchronization is still possible since the delay is a known constant. Different areas of the network may experience long-duration disturbances at different frequencies. Assets may need to be configured to search for a specific frequency if searching for all frequencies is not an option due to processing limitations. The headend system 210 may automatically configure assets to focus on a specific frequency depending on disturbances present in the area.

Assets that synchronize their time using grid events with a higher accuracy such as better than +1-3.3 ms can determine their phases. Many types of grid events occur simultaneously on all phases. A positive-going zero crossing of the voltage signal occurs every 20 ms and each phase is delayed by 6.666 ms. By calculating the time period between a positive zero crossing and the grid synchronization event, the phase can be directly determined because each phase A, B or C will have a period that differs by a multiple of 6.666 ms. The period can be represented in a descriptor and transmitted to the headend system 210 where a determination can be made by comparing the period of an asset with an unknown phase with one that has a known phase.

Synchronizing events in the electrical power distribution system 100 can be useful for identifying segments as well as phase. Some classes of synchronizing events may propagate across a large number of assets and segments. Time of reception can act as a reference point for the time of occurrence of localized events. Assets on the same segment will have a similar time period between the time of a synchronizing event and time of local disturbance. This time period can be transmitted to the headend system 210 in the form of a descriptor where it can be grouped with other similar descriptors to identify segments and phases of the assets. In addition, synchronizing events can trigger the sending of time adjustment messages from the headend system 210 to assets. This can occur when some assets contain high accuracy clocks. When high accuracy assets report synchronizing events to the headend system 210, the reporting message can also include when that event occurred relative to their accurate clock. In this way, the headend system 210 can learn the precise time when the event occurred. With this information, the headend system 210 can inform other assets that have also detected the event the exact time when the event occurred, allowing the other assets to adjust their clocks accordingly.

Exemplary Meter

Figure 7:
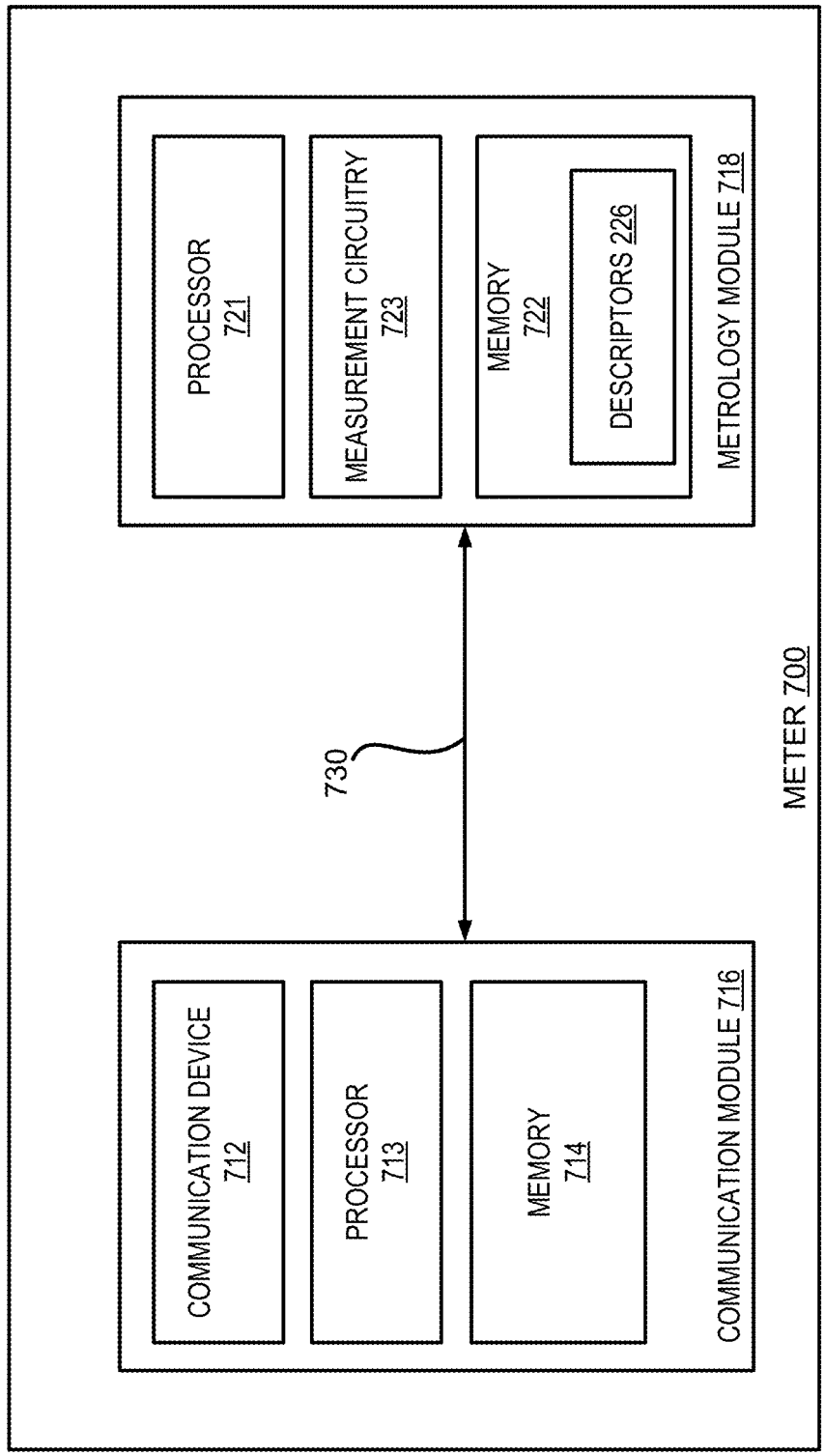
FIG. 7 is a block diagram depicting an example of a meter suitable for implementing aspects of the techniques and technologies presented herein.

FIG. 7 illustrates an exemplary meter 700 that can be employed to implement the sensor data collection and descriptor generation described herein, such as a meter 160. The meter 700 includes a communication module 716 and a metrology module 718 connected through a local or serial connection 730. These two modules may be housed in the same unit on separate boards hence the local connection 730 may be an onboard socket. These two modules may also be housed in the same unit with a single processor and memory block that performs multiple tasks including sensing/metering and communication coordination. Alternatively, the modules may be housed separately and thus the local connection 730 may be a communication cable, such as a USB cable, or another conductor.

The function of the communication module 716 includes sending descriptors 226 and other data to other meters or the headend system 210 and receiving data from the headend system 210 or other meters. The function of the metrology module 718 includes the functions necessary to manage the resource, in particular, to allow access to the resource and to measure the resource used. The communication module 716 may include a communication device 712 such as an antenna and a radio. Alternatively, the communication device 712 may be any device that allows wireless or wired communication. The communication module 716 may also include a processor 713, and memory 714. The processor 713 controls functions performed by the communication module 716. The memory 714 may be utilized to store data used by the processor 713 to perform its function. The memory 714 may also temporarily store other data for the meter 700 such as the descriptors 226.

The metrology module 718 may include a processor 721, memory 722, and measurement circuitry 723. The measurement circuitry 723 handles the measuring of the resource and may be used as the sensor to collect sensor data. The processor 721 in the metrology module 718 controls functions performed by the metrology module 718. For example, the processor 721 is configured to calculate the descriptors 226 as described above based on the sensor data obtained by the measurement circuitry 723. The memory 722 stores data needed by the processor 721 to perform its functions. The memory 722 also stores the descriptors 226 that are calculated by the processor 721. The communication module 716 and the metrology module 718 communicate with each other through the local connection 730 to provide data needed by the other module. Both the communication module 716 and the metrology module 718 may include computer-executable instructions stored in memory or in another type of computer-readable medium and one or more processors within the modules may execute the instructions to provide the functions described herein.

Example of a Headend System for Implementing Certain Embodiments

Figure 8:
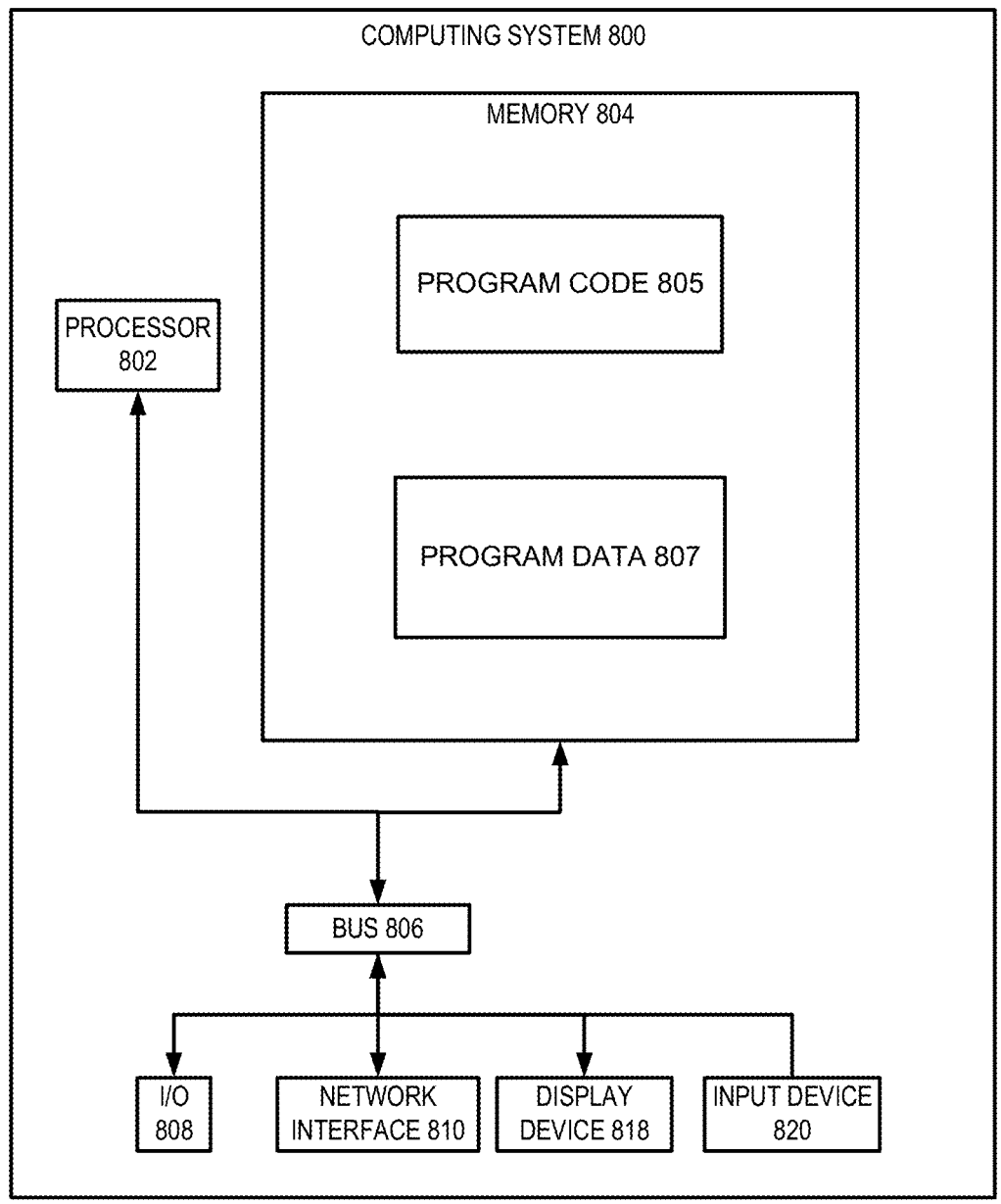
FIG. 8 is a block diagram depicting an example of a computing system suitable for implementing aspects of the techniques and technologies presented herein.

Any suitable computing system or group of computing systems can be used for performing the operations described herein. For example, FIG. 8 depicts an example of the computing system 800. The implementation of computing system 800 could be used for the headend system 210.

The depicted example of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

A memory device 804 includes any suitable non-transitory computer-readable medium for storing program code 805, program data 807, or both. A computer-readable medium can include any electronic, optical, magnetic, or other storage devices capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 800 executes program code 805 that configures the processor 802 to perform one or more of the operations described herein. Examples of the program code 805 include, in various embodiments, the program code used to identify segment and phase of assets based on regular descriptors and fast descriptors, or other suitable applications that perform one or more operations described herein. The program code may be resident in the memory device 804 or any suitable computer-readable medium and may be executed by the processor 802 or any other suitable processor.

In some embodiments, one or more memory devices 804 stores program data 807 that includes one or more datasets described herein. Examples of these datasets include past secure tokens, the global token table, etc. In some embodiments, one or more of data sets, models, and functions are stored in the same memory device (e.g., one of the memory devices 804). In additional or alternative embodiments, one or more of the programs, data sets, models, and functions described herein are stored in different memory devices 804 accessible via a data network. One or more buses 806 are also included in the computing system 800. The buses 806 communicatively couples one or more components of a respective one of the computing system 800.

In some embodiments, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices via a data network using the network interface device 810.

The computing system 800 may also include a number of external or internal devices, an input device 820, a presentation device 818, or other input or output devices. For example, the computing system 800 is shown with one or more input/output ("I/O") interfaces 808. An I/O interface 808 can receive input from input devices or provide output to output devices. An input device 820 can include any device or group of devices suitable for receiving visual, auditory, or other suitable input that controls or affects the operations of the processor 802. Non-limiting examples of the input device 820 include a touchscreen, a mouse, a keyboard, a microphone, a separate mobile computing device, etc. A presentation device 818 can include any device or group of devices suitable for providing visual, auditory, or other suitable sensory output. Non-limiting examples of the presentation device 818 include a touchscreen, a monitor, a speaker, a separate mobile computing device, etc.

Although FIG. 8 depicts the input device 820 and the presentation device 818 as being local to the computing device that executes the headend system 210, other implementations are possible. For instance, in some embodiments, one or more of the input device 820 and the presentation device 818 can include a remote client-computing device that communicates with the computing system 800 via the network interface device 810 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
receiving, by a headend system, descriptors from a plurality of utility devices connected to a resource distribution system, the descriptors being generated at the respective utility devices by processing sensor data obtained at the respective utility devices;
determining that the descriptors contain synchronizing events;
adjusting timing of other events in the descriptors using a time of occurrence of the synchronizing events as a reference time;
determining, based on the synchronizing events, time offsets for one or more of the plurality of utility devices;
transmitting instructions to the one or more of the plurality of utility devices to correct clocks according to the respective time offsets;
determining a mode of the plurality of utilize devices;
in response to determining that the mode of the plurality of utility devices is a regular mode,
grouping, by the headend system, the plurality of utility devices to generate a current grouping by applying clustering algorithms to the descriptors of the plurality of utility devices, and
assigning, by the headend system, at least one of a segment identifier or a phase identifier to one or more of the plurality of utility devices based, at least in part, upon the current grouping;
in response to determining that the mode of the plurality of utility devices is a fast mode, wherein in the fast mode, the segment identifier or the phase identifier is assigned to a utility device in a shorter time period than the regular mode,
grouping the plurality of utility devices by correlating the descriptors;
generating assignment information by assigning at least one of a segment identifier or a phase identifier to an unknown utility device among the plurality of utility devices based on the grouping; and
sending the assignment information to the unknown utility device.

2. The method of claim 1, further comprising sending instructions to the plurality of utility devices to exit the fast mode.

3. The method of claim 1, further comprising:
comparing the current grouping with past groupings to determine a confidence level of the grouping; and
determining whether the confidence level exceeds a threshold confidence value, wherein assigning the at least one of a segment identifier or a phase identifier is performed in response to determining that the confidence level exceeds the threshold confidence value.

4. The method of claim 3, wherein comparing the current grouping with past groupings to determine a confidence level of the grouping comprises assigning a high confidence level in response to determining that a set of utility devices are grouped together in the current grouping and the past groupings; and assigning a low confidence level in response to determining that a set of utility devices are grouped differently in the current grouping than the past groupings.

5. The method of claim 3, further comprising: in response to determining that the confidence level does not exceed the threshold confidence value, generating and sending a new descriptor configuration to one or more of the plurality of utility devices.

6. A non-transitory computer-readable storage medium having program code that is executable by a processor device to cause a computing device to perform operations, the operations comprising:
assessing descriptors generated by a plurality of utility devices connected to a resource distribution system, the descriptors being generated at the respective utility devices by processing sensor data obtained at the respective utility devices;
determining that the descriptors contain synchronizing events;
adjusting timing of other events in the descriptors using a time of occurrence of the synchronizing events as a reference time;
determining, based on the synchronizing events, time offsets for one or more of the plurality of utility devices;
transmitting instructions to the one or more of the plurality of utility devices to correct clocks according to the respective time offsets;
determining a mode of the plurality of utilize devices;
in response to determining that the mode of the plurality of utility devices is a regular mode,
grouping the plurality of utility devices to generate a current grouping by applying clustering algorithms to the descriptors of the plurality of utility devices, and
assigning at least one of a segment identifier or a phase identifier to one or more of the plurality of utility devices based, at least in part, upon the current grouping;
in response to determining that the mode of the plurality of utility devices is a fast mode, wherein in the fast mode, the segment identifier or the phase identifier is assigned to a utility device in a shorter time period than the regular mode,
grouping the plurality of utility devices by correlating the descriptors;
generating assignment information by assigning at least one of a segment identifier or a phase identifier to an unknown utility device among the plurality of utility devices; and
sending the assignment information to the unknown utility device.

7. The non-transitory computer-readable storage medium of claim 6, wherein the operations further comprise:
comparing the current grouping with past groupings to determine a confidence level of the grouping; and
determining whether the confidence level exceeds a threshold confidence value, wherein assigning the at least one of a segment identifier or a phase identifier is performed in response to determining that the confidence level exceeds the threshold confidence value.

8. The non-transitory computer-readable storage medium of claim 7, wherein comparing the current grouping with past groupings to determine a confidence level of the grouping comprises assigning a high confidence level in response to determining that a set of utility devices are grouped together in the current grouping and the past groupings; and assigning a low confidence level in response to determining that a set of utility devices are grouped differently in the current grouping than the past groupings.

9. The non-transitory computer-readable storage medium of claim 7, wherein the operations further comprise:
in response to determining that the confidence level does not exceed the threshold confidence value, generating and sending a new descriptor configuration to one or more of the plurality of utility devices.

10. A headend system, comprising:
a processing device; and
a memory device in which instructions executable by the processing device are stored for causing the processing device to perform operations comprising:
   accessing descriptors from a plurality of utility devices connected to an electrical power distribution system and communicatively connected to the headend system;
   determining that the descriptors contain synchronizing events; and
   adjusting timing of other events in the descriptors using a time of occurrence of the synchronizing events as a reference time;
   determining, based on the synchronizing events, time offsets for one or more of the plurality of utility devices;
   transmitting instructions to the one or more of the plurality of utility devices to correct clocks according to the respective time offsets;
   determining whether the plurality of utility devices operate in a fast mode or a regular mode, wherein in the fast mode, a segment identifier or a phase identifier is assigned to a utility device among the plurality of utility devices in a shorter time period than the regular mode;
   responsive to determining that the plurality of utility devices operate in the regular mode,
      grouping the plurality of utility devices to generate a current grouping by applying clustering algorithms to the descriptors of the plurality of utility devices; and
      assigning at least one of a segment identifier or a phase identifier to one or more of the plurality of utility devices based, at least in part, upon the current grouping; and
   responsive to determining that the plurality of utility devices operate in the fast mode,
      grouping the plurality of utility devices by correlating the descriptors; and
      generating assignment information by assigning at least one of a segment identifier or a phase identifier to an unknown utility device among the plurality of utility devices based, at least in part, upon the correlating.

11. The headend system of claim 10, wherein the operations further comprise sending instructions to the plurality of utility devices to exit the fast mode.

12. The headend system of claim 10, wherein the operations further comprise:
   comparing the current grouping with past groupings to determine a confidence level of the grouping; and
   determining whether the confidence level exceeds a threshold confidence value, wherein assigning the at least one of a segment identifier or a phase identifier is performed in response to determining that the confidence level exceeds the threshold confidence value.

13. The headend system of claim 12, wherein comparing the current grouping with past groupings to determine a confidence level of the grouping comprises assigning a high confidence level in response to determining that a set of utility devices are grouped together in the current grouping and the past groupings; and assigning a low confidence level in response to determining that a set of utility devices are grouped differently in the current grouping than the past groupings.

14. The headend system of claim 12, wherein the operations further comprise:
   in response to determining that the confidence level does not exceed the threshold confidence value, generating and sending a new descriptor configuration to one or more of the plurality of utility devices.

* * * * *